(12) United States Patent
van Diggelen et al.

(10) Patent No.: US 6,651,000 B2
(45) Date of Patent: *Nov. 18, 2003

(54) METHOD AND APPARATUS FOR GENERATING AND DISTRIBUTING SATELLITE TRACKING INFORMATION IN A COMPACT FORMAT

(75) Inventors: Frank van Diggelen, San Jose, CA (US); Charles Abraham, San Jose, CA (US); James W. LaMance, San Jose, CA (US)

(73) Assignee: Global Locate, Inc., San Jose, CA (US)

( * ) Notice: Subject to any disclaimer, the term of this patent is extended or adjusted under 35 U.S.C. 154(b) by 81 days.

This patent is subject to a terminal disclaimer.

(21) Appl. No.: 09/915,219

(22) Filed: Jul. 25, 2001

(65) Prior Publication Data

US 2003/0023379 A1 Jan. 30, 2003

(51) Int. Cl.[7] ............................................... G01C 21/26
(52) U.S. Cl. ................... 701/213; 342/352; 342/357.07
(58) Field of Search ......................... 701/213; 342/352, 342/357.02, 357.06, 357.07, 357.16

(56) References Cited

U.S. PATENT DOCUMENTS

| | | | |
|---|---|---|---|
| 5,444,450 A | 8/1995 | Olds et al. ............. 342/357.02 |
| 5,613,193 A | 3/1997 | Ishikawa et al. ........... 455/12.1 |
| 5,812,087 A | 9/1998 | Krasner ...................... 342/357 |
| 5,920,278 A | 7/1999 | Tyler et al. .................... 342/33 |
| 6,064,336 A | * 5/2000 | Krasner ................... 342/357.05 |
| 6,067,045 A | 5/2000 | Castelloe et al. ....... 342/357.09 |
| 6,078,284 A | 6/2000 | Levanon ................ 342/357.16 |
| 6,118,977 A | 9/2000 | Vannucci ................... 455/12.1 |
| 6,134,483 A | 10/2000 | Vayanos et al. ............. 701/13 |
| 6,188,354 B1 | 2/2001 | Soliman et al. ............. 342/387 |
| 6,204,804 B1 | 3/2001 | Andersson .................. 342/113 |
| 6,211,819 B1 | 4/2001 | King et al. ............. 342/357.09 |
| 6,215,441 B1 | 4/2001 | Moeglein et al. ....... 342/357.01 |
| 6,252,543 B1 | 6/2001 | Camp .................... 342/357.06 |
| 6,313,787 B1 | 11/2001 | King et al. ............ 342/357.03 |
| 6,411,899 B2 | * 6/2002 | Dussell et al. .............. 701/211 |
| 6,437,735 B1 | 8/2002 | McMahan ................ 342/357.1 |

OTHER PUBLICATIONS

Copy of International Search Report dated May 29, 2003 for corresponding PCT application, PCT/US02/23282.

* cited by examiner

*Primary Examiner*—Marthe Y. Marc-Coleman
(74) *Attorney, Agent, or Firm*—Moser, Patterson & Sheridan, LLP (57) ABSTRACT

A method and apparatus for creating and distributing satellite tracking data in a compact format to a remote receiver. At least a portion of the satellite tracking data is extracted from memory and is formatted into a compact format. The compact formatted data is transmitted to the remote receiver via a distribution network. Once this data is received at the remote receiver it is reformatted into a format prescribed by the remote receiver

33 Claims, 4 Drawing Sheets

METHOD AND APPARATUS FOR GENERATING AND DISTRIBUTING SATELLITE TRACKING INFORMATION IN A COMPACT FORMAT

CROSS-REFERENCE TO RELATED APPLICATIONS

This application contains subject matter that is related to a U.S. patent application Ser. No. 09/875,809, filed Jun. 6, 2001, which is herein incorporated by reference in its entirety.

BACKGROUND OF THE INVENTION

1. Field of the Invention

The present invention generally relates to generating satellite tracking information for earth orbiting satellites. More specifically, the invention relates to a method and apparatus for generating and distributing satellite tracking information in a first format (e.g., a compact ephemeris model) through a network or communications link, then representing the satellite tracking information in a second format (e.g., a standard ephemeris model) at a receiver.

2. Description of the Related Art

A positioning receiver for the Global Positioning System (GPS) uses measurements from several satellites to compute a position. The process of acquiring the GPS radio signal is enhanced in speed and sensitivity if the GPS receiver has prior access to a model of the satellite orbit and clock. This model is broadcast by the GPS satellites and is known as ephemeris or ephemeris information. Each satellite broadcasts its own ephemeris once every 30 seconds. Once the GPS radio signal has been acquired, the process of computing position requires the use of the ephemeris information.

The broadcast ephemeris information is encoded in a 900 bit message within the GPS satellite signal. It is transmitted at a rate of 50 bits per second, taking 18 seconds in all for a complete ephemeris transmission. The broadcast ephemeris information is typically valid for 2 to 4 hours into the future (from the time of broadcast). Before the end of the period of validity the GPS receiver must obtain a fresh broadcast ephemeris to continue operating correctly and produce an accurate position. It is always slow (no faster than 18 seconds), frequently difficult, and sometimes impossible (in environments with very low signal strengths), for a GPS receiver to download an ephemeris from a satellite. For these reasons it has long been known that it is advantageous to send the ephemeris to a GPS receiver by some other means in lieu of awaiting the transmission from the satellite. U.S. Pat. No. 4,445,118, issued Apr. 24, 1984, describes a technique that collects satellite orbit information at a GPS reference station, and transmits the information to the remote GPS receiver via a wireless transmission. This technique of providing the ephemeris, or equivalent data, to a GPS receiver has become known as "Assisted-GPS". Since the source of ephemeris in Assisted-GPS is the satellite signal, the ephemeris information remains valid for only a few hours. As such, the remote GPS receiver must periodically connect to a source of ephemeris information whether that information is received directly from the satellite or from a wireless transmission. Without such a periodic update, the remote GPS receiver will not accurately determine position.

Furthermore, the Assisted-GPS systems typically retransmit the entire ephemeris message to the remote receiver. In many instances, bandwidth or packet size for the transmission of this message is not readily available.

Therefore, there is a need for a method and apparatus for providing satellite trajectory and clock information to a remote receiver in a compact form.

SUMMARY OF THE INVENTION

The present invention is a method and apparatus for generating satellite tracking data (STD), then transmitting the data to a remote receiver in a compact form. The STD is derived by receiving at one or more satellite tracking stations the signals from at least one satellite and determining satellite tracking information (STI) through signal processing or by extracting the ephemeris message from the received signals. STI contains present satellite orbit trajectory data and satellite clock information.

The STD is reformatted into a compact format and provided to a remote satellite signal receiver via a network or communications system. The receiver converts the compact format into a standard format and uses the STD to compute the position of the receiver. The satellite system may include the global positioning system (GPS), GLONASS, GALILEO, or other satellite systems that may use STD to enhance the performance of the receiver.

BRIEF DESCRIPTION OF THE DRAWINGS

So that the manner in which the above recited features of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

Figure 1:
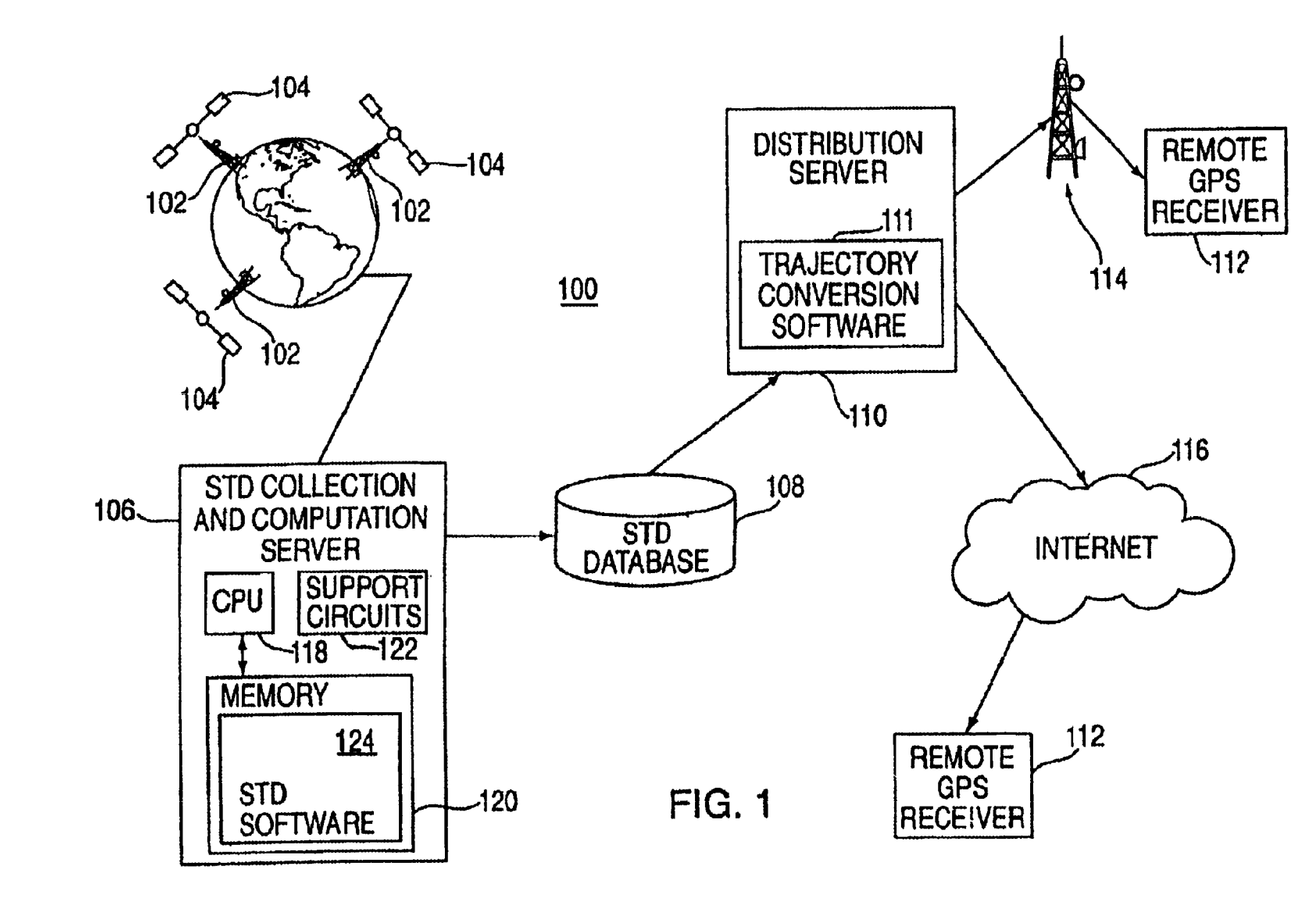
FIG. 1 depicts a system for creating and distributing satellite tracking data (STD) to remote GPS receivers.

FIG. 1 depicts a block diagram of a system 100 for creating and distributing satellite tracking data (STD). The satellite system may include the global positioning system (GPS), GLONASS, GALILEO, or other satellite systems that may use STD to enhance the performance of the receiver. The following disclosure uses GPS as an illustrative system within which the invention operates. From the following disclosure, those skilled in the art will be able to practice the invention in conjunction with other satellite based positioning systems.

A network of GPS tracking stations 102 is used to collect measurement data from the GPS satellites 104. Such a network is described in detail in U.S. patent application Ser. No. 09/615,105, filed Jul. 13, 2000 and incorporated herein by reference. The network could comprise several tracking stations that collect satellite tracking information (STI) from all the satellites in the constellation, or a few tracking stations, or a single tracking station that only collects STI for a particular region of the world. An STD collection and computation server 106 collects and processes the measurement data (this measurement data is referred to herein as satellite tracking information (STI) that includes at least one of: code phase measurements, carrier phase measurements, Doppler measurements, or ephemeris data). The ephemeris data may be the decoded ephemeris message extracted from the GPS signal itself.

The server may create long term STD in accordance with the teachings of U.S. patent application Ser. No. 09/875,809, filed Jun. 6, 2001, or standard ephemeris message data in accordance with the teachings of U.S. Pat. No. 5,365,450, issued Nov. 15, 1994, both of which are incorporated herein by reference. The server 106 may produce one or more of the following: 1) accurate satellite tracking data (STD) (e.g., a trajectory of each satellite and/or a clock offset measurement) during the data collection period, 2) a prediction of the future STD of each satellite, and 3) models that match the future STD of each satellite.

The server 106 comprises a central processing unit (CPU) 118, support circuits 122, and memory 120. The CPU 118 may be any one of the many CPUs available on the market to perform general computing. Alternatively, the CPU may be a specific purpose processor such as an application specific integrated circuit (ASIC) that is designed to process satellite tracking information. The support circuits 122 are well known circuits such as clock circuits, cache, power supplies and the like. The memory 120 may be read only memory, random access memory, disk drive storage, removable storage or any combination thereof. The memory 120 stores executable software, e.g., STD software 124, that, when executed by the CPU 118, causes the system 100 to operate in accordance with the present invention.

The set of satellite trajectory and clock data produced by the STD software 124. The STD is stored in an STD database 108. A distribution server 110 accesses the database 108 to gather the most recent set of STD, formats the data using the formatting software 111, and distributes the formatted data to GPS devices 112 that require satellite orbit information. The software 111 produces a compact format, e.g., a compact ephemeris model, in accordance with the present invention.

The distribution process may be implemented using some form of wireless communications system 114, or over the Internet 116, or a combination of both, or by some other means of communication. Once the GPS devices 112 have received the compact ephemeris model, they expand the model to a format that is conventional for receiver. The compact ephemeris model distributed to the GPS devices may be in a similar format as the broadcast ephemeris or may be some other model format that is defined by the GPS device. Herein this orbit data is generally referred to as a satellite tracking model (STM). The loading of the STM into the GPS receiver can be accomplished in many ways. Using the cradle for a personal digital assistant (PDA), direct connection to a network, or a wireless technology, such as Bluetooth or a cellular network, are a few examples of how the satellite data can be transferred to the receiver. The transmission is generally accomplished by broadcasting a compact model of the STD (or a compact model representing a portion of the STD) without knowledge of the specific location of the GPS receiver. As such, the distribution server does not require the GPS receiver to send any information through the network to the distribution server.

Since GPS is a ranging system in and of itself, the data transmitted by the GPS satellites can be used to determine the range, range-rate and clock offsets to the GPS satellites from a set of tracking stations. This set of observations generated by the tracking stations 102 is used in the orbit determination process, and in the estimation of the satellite clock characteristics. The set of monitoring stations 102 could be a single station, a public network such as the Continuously Operating Reference System (CORS), or a privately owned and/or operated network.

Figure 2:
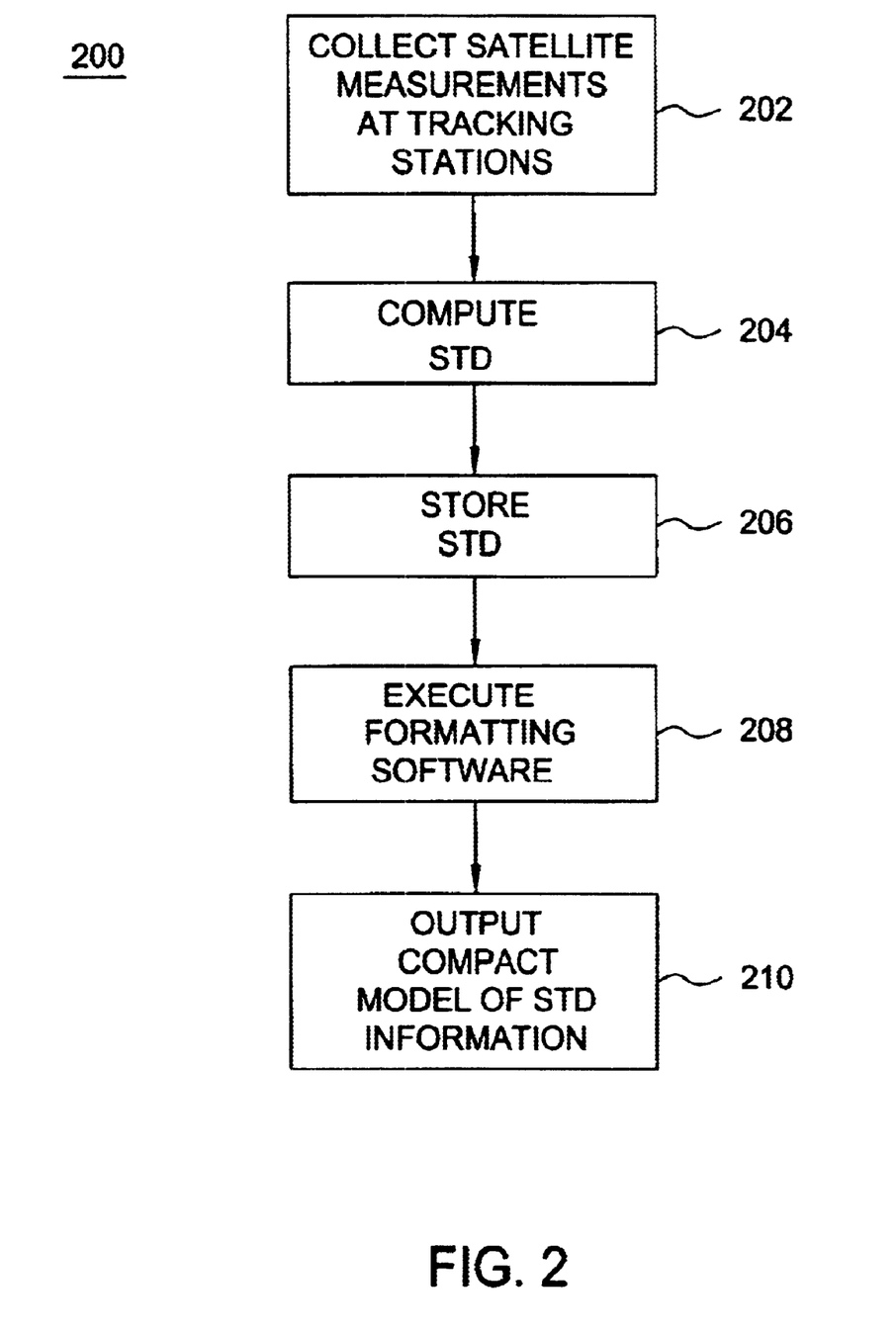
FIG. 2 depicts a flow diagram of a method for forming the STD from the satellite measurements made at satellite tracking stations.

FIG. 2 depicts a flow diagram of the process 200 of the present invention. The process 200 begins at step 202, wherein the satellite measurements are collected at the tracking stations. At step 204, the satellite trajectory data (STD) is computed or extracted from the satellite signals. The STD is then stored at step 206 in the STD database. At step 208, the database is accessed and the formatting software is executed to convert the formatting of the accessed STD. The formatted STD is output as the compact model at step 210.

One embodiment of the invention formats the STD as a subset of the standard ephemeris parameters defined in ICD-GPS-200c. Fitting the STD to the desired compact orbit model can be accomplished in a number of mathematical methods. The preferred embodiment is a least-squares fit of the orbit model parameters to the trajectory data. Other methods, such as Kalman filters or other estimators can also be used to obtain the orbit model parameters that best fit the trajectory data. These techniques of fitting data to orbit models are well known to people skilled in the art of orbit determination and orbit modeling.

Figure 3:
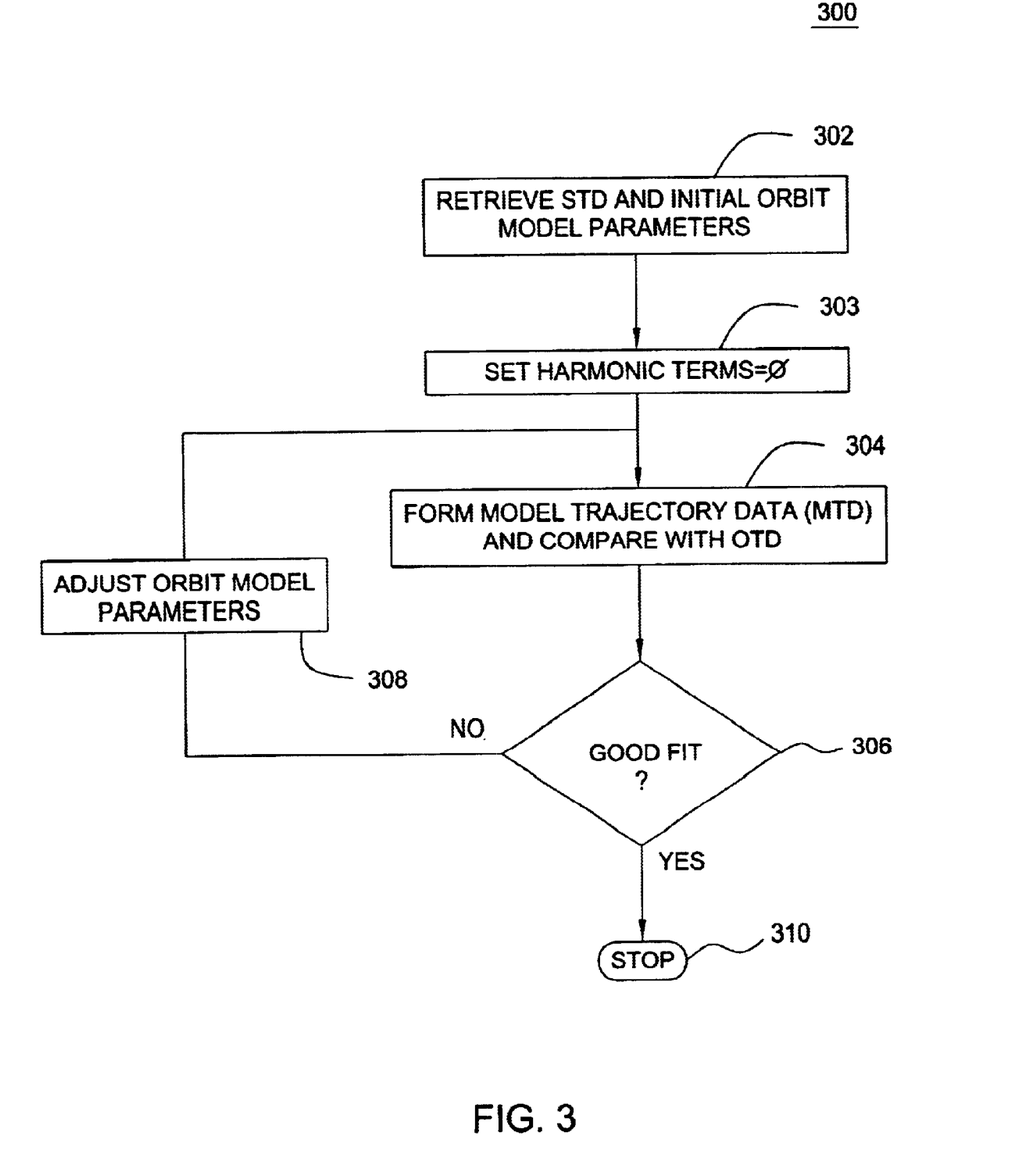
FIG. 3 depicts a flow diagram of a method for forming a compact orbit model in accordance with the present invention.

The least squares technique provides an optimal fit of the trajectory data to the model trajectory formed from the compact orbit model parameters. FIG. 3 depicts a flow diagram of a method of generating an orbit model using a least squares estimation technique.

At step 302, the STD for the desired time interval is extracted from the STD database. The orbit model parameters are initialized to the orbit model values obtained by a similar process for the previous interval. This guarantees that the initial orbit model parameters are a good fit at least for the beginning of the desired time interval. The rest of the process 300 will ensure that the parameters are adjusted so that they become a good fit for the entire time interval.

In the preferred embodiment there are 15 orbital parameters to be adjusted:

Square root of semi-major axis (meters^½)

Eccentricity (dimensionless)

Amplitude of sine harmonic correction term to the orbit radius (meters)

Amplitude of cosine harmonic correction term to the orbit radius (meters)

Mean motion difference from computed value (radians/sec)

Mean anomaly at reference time (radians)

Amplitude of cosine harmonic correction term to the argument of latitude (radians)

Amplitude of sine harmonic correction term to the argument of latitude (radians)

Amplitude of cosine harmonic correction term to the angle of inclination (radians)

Amplitude of sine harmonic correction term to the angle of inclination (radians)

Longitude of ascending node of orbit plane at weekly epoch (radians)

Inclination angle at reference time (radians)

Rate of inclination angle (radians/sec)

Argument of perigee (radians)

Rate of right ascension (radians/sec)

At step 303, some of the terms in the 15 term set are set to zero. The terms that are selected are the 6 harmonic terms such that there are 9 remaining parameters. This approach is particularly useful when bandwidth and/or packet size is limited in the communication link that will be used to convey the orbit model to the satellite signal receiver, e.g., the remote GPS receiver. The subset of 9 parameters, by setting all harmonic terms in the model to zero, is:

Square root of semi-major axis (meters^½)

Eccentricity (dimensionless)

Mean motion difference from computed value (radians/sec)

Mean anomaly at reference time (radians)

Longitude of ascending node of orbit plane at weekly epoch (radians)

Inclination angle at reference time (radians)

Rate of inclination angle (radians/sec)

Argument of perigee (radians)

Rate of right ascension (radians/sec)

The receiver can then reconstruct a standard ephemeris model by setting the "missing" harmonic terms to zero. In essence, the receiver reformats the STD for processing by the receiver circuits.

Figure 4:
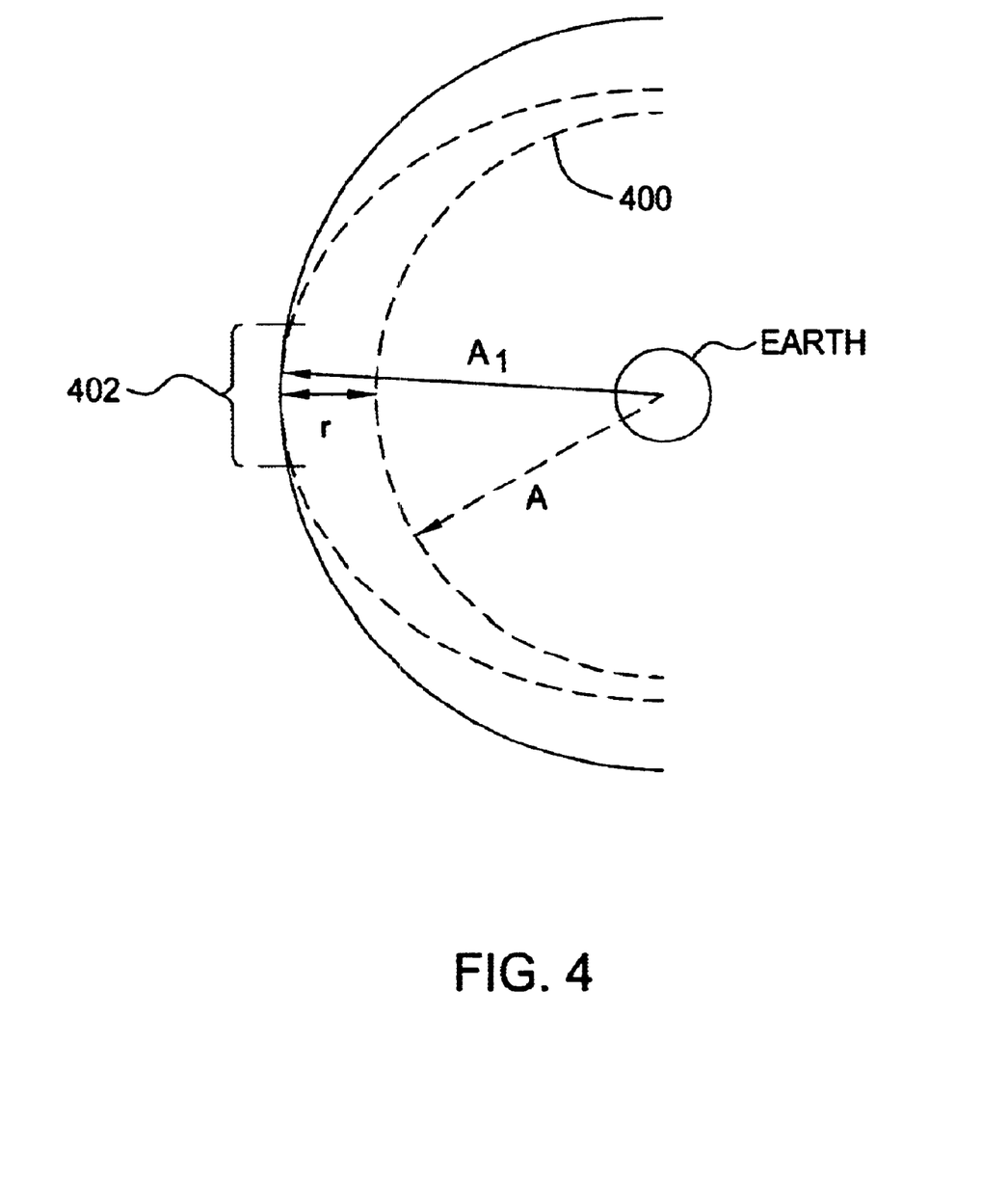
FIG. 4 depicts an example of compacting the orbit model, where two orbit model terms are compacted into a single term.

As an example of the method of generating the compact model, consider FIG. 4, which shows, for simplicity, just two terms of an orbit 400: an orbital radius (A), and a radial harmonic term (r). For this simple example, these two terms form the non-compact model, wherein the orbit is described by a circle of radius (A) plus a harmonic perturbation (r). To produce a more compact model that fits the actual orbit over an interval 402, the method of the invention removes the harmonic term (i.e., sets the term (r) to zero) and increases the orbital radius (A) to a larger value ($A_1$). The compact model is an orbit described by a circle with radius $A_1$. If an application requires a non-compact orbit model, then the compact model ($A_1$) can be represented as a non-compact model by specifying a harmonic term ($r_1$) equal to zero. This compact model will fit the original orbit, over an interval 402, with a small error.

In the preferred embodiment, 6 harmonic terms are removed from the 15-parameter model, and the other 9 terms are adjusted by process 300 that is analogous to the example 400 to provide a compact model that is accurate over a pre-defined interval. By adjusting the 9 remaining terms of an orbit model, while "zeroing" 6 harmonic terms, the compact model can be made accurate over a period of time such that a GPS receiver that relies on a compact model to compute position would compute a location that is no more than 2 meters less accurate than if the receiver used a full orbit model to compute position.

There are many alternative embodiments that will be readily apparent to those skilled in the art, such as removing more or fewer terms before adjusting the remaining terms, setting removed terms to some value other than zero, and defining new terms that model the orbit.

Returning to FIG. 3, at step 304, the orbit model is used to predict what the trajectory would be, the predicted data is denoted the "Model Trajectory Data" (MTD). If the model were perfect, the MTD would coincide exactly with the STD. At step 306, the MTD and STD are compared to see how closely the orbit model fits the orbit data. In the preferred embodiment, the comparison step 306 is performed by summing the squares of the differences between each trajectory point in the STD and the corresponding point in the MTD, and comparing the resulting sum to a threshold. If the fit is "good", the model parameters are deemed "good" and the process stops at step 310. If the fit is not good then the model parameters are adjusted at step 308. There are many techniques well known in the art for adjusting model parameters to fit data. Steps 304, 306 and 308 are repeated until the model parameters are found that fit the STD well.

There are a large number of alternative embodiments to reduce the size of the data, i.e., compacting the STD, while still providing a model that fits the STD, including:

Removing parameters from the model, and replacing them with a constant, such as zero—as done above—or some other predetermined value, which is either stored in the Remote GPS Receiver, or occasionally sent to the receiver. The predetermined value may be determined by a GPS almanac stored at both the receiver, and the distribution server.

The resolution of the parameters may be restricted in the process 300, this too reduces the amount of data that must be sent to the mobile GPS receiver.

Parameters, which are similar among two or more satellites, may be represented as a master value plus a delta, where the delta requires fewer bits to encode; an example of this is the parameter Eccentricity, which changes very little among different GPS satellites.

Some of these approaches reduce the ability of the model to fit the data over a period of time (e.g., four hours). In this case, the fit interval may be reduced (e.g. to two hours) to compensate. The accuracy of fit of the model can be traded off against the period of time over which the model is valid.

While the foregoing is directed to the preferred embodiment of the present invention, other and further embodiments of the invention may be devised without departing from the basic scope thereof, and the scope thereof is determined by the claims that follow.

What is claimed is:

1. A method of creating and distributing compact satellite orbit models comprising:

receiving satellite signals from at least one satellite and at least one receiving station;

extracting at least a portion of the satellite tracking data from said satellite signal, representing said data in a first format;

transmitting the formatted data to a remote receiver; and at the remote receiver, representing said formatted data in a second format supported by the remote receiver.

2. The method of claim 1 wherein said satellite tracking data comprises at least one of a satellite orbit model or a satellite clock model.

3. The method of claim 1 wherein said satellite tracking data comprises at least one of: data representative of a satellite orbit model, orbit model, data representative of a satellite clock model.

4. The method of claim 1 wherein said second format is a format that is prescribed by said remote receiver.

5. The method of claim 1 wherein said second format comprises parameters defined in ICD-GPS-200.

6. The method of claim 1 wherein said first format comprises a first set of terms that define a first form of orbit model, and said second format comprises a second set of terms that define a second form of orbit model, and said second set of terms is larger than said first set of terms.

7. The method of claim 1 wherein said first format comprises a first set of terms that define a first form of orbit model, and said second format comprises a second set of terms that define a second form of orbit model, where said second set of terms contains said first set of terms.

8. The method of claim 1 wherein said first format comprises a first set of terms that define a first form of orbit model and said second format comprises a second set of terms that define a second form of orbit model, and at least one term of said first set is defined as a number with lower resolution than the corresponding term in second set.

9. The method of claim 1 where said data in a first format requires fewer bits to encode it than said data in a second format.

10. The method of claim 1 wherein said remote receiver is a GPS receiver.

11. The method of claim 1 wherein said remote receiver is a satellite positioning system receiver.

12. The method of claim 1 wherein said second format is a standard format for providing satellite models to a global positioning system receiver.

13. The method of claim 1 wherein said transmitting is performed using a wireless communications link.

14. The method of claim 13 wherein said transmitting is done without requiring from said remote receiver data representative of said remote receiver's position.

15. The method of claim 1 where an accuracy of the data in said first format is increased by decreasing a time interval represented by said formatted data.

16. A method of creating and distributing a compact orbit model comprising:

receiving satellite signals from at least one receiving station;

extracting at least a portion of the satellite tracking data from the satellite signal, where said portion comprises a first number of orbit terms that define a first orbit model;

formatting said portion to form formatted data having a second number of orbit terms that define a second orbit model, where said first number is greater than said second number;

transmitting the formatted data to a remote receiver; and at the remote receiver, expanding the formatted data to have the first number of terms.

17. The method of claim 16 wherein said satellite tracking data comprises at least one of a satellite orbit model or a satellite clock model.

18. The method of claim 16 wherein said satellite tracking data comprises at least one of: data representative of a satellite orbit model, orbit model, data representative of a satellite clock model.

19. The method of claim 16 wherein said second orbit model is a compact orbit model.

20. The method of claim 16 wherein said expanding step results in a data format that is prescribed by said remote receiver.

21. The method of claim 20 wherein the data format having the first number of terms comprises parameters defined in ICD-GPS-200.

22. The method of claim 16 where said terms in said second orbit model require fewer bits to encode it than said terms in a first orbit model.

23. The method of claim 16 wherein said remote receiver is a GPS receiver.

24. The method of claim 16 wherein said remote receiver is a satellite positioning system receiver.

25. The method of claim 16 where an accuracy of the data in said second orbit model is increased by decreasing a time interval represented by said formatted data defining said second orbit model.

26. A method of creating a compact orbit model comprising:

providing a satellite orbit model having a first set of terms;

adjusting the first set of terms to produce a compact orbit model having a second set of terms, where a number of terms in the first set of terms is greater than a number of terms in said second set of terms.

27. The method of claim 26 wherein said adjusting step further comprises:

zeroing a plurality of terms in said first set of terms.

28. The method of claim 27 wherein said adjusting step further comprises:

adjusting a plurality of non-zero terms in the second set of terms in response to the effects of zeroing terms in the first set of terms.

29. Apparatus for creating and distributing compact satellite orbit models comprising:

at least one satellite signal receiver for receiving satellite signals from at least one satellite;

means for extracting at least a portion of the satellite tracking data from said satellite signal, representing said data in a first format;

a transmitter for transmitting the formatted data to a remote receiver; and at the remote receiver, representing said formatted data in a second format supported by the remote receiver.

30. The apparatus of claim 29 wherein said second format is a format that is prescribed by said remote receiver.

31. The apparatus of claim 29 wherein said second format comprises parameters defined in ICD-GPS-200.

32. The apparatus of claim 29 wherein said first format comprises a first set of terms that define a first form of orbit model, and said second format comprises a second set of terms that define a second form of orbit model, and said second set of terms is larger than said first set of terms.

33. The apparatus of claim 29 wherein said transmitter is a wireless communications transmitter.

* * * * *

INTER PARTES REEXAMINATION CERTIFICATE (0316th)

United States Patent
van Diggelen et al.

(10) Number: US 6,651,000 C1
(45) Certificate Issued: *Nov. 15, 2011

(54) METHOD AND APPARATUS FOR GENERATING AND DISTRIBUTING SATELLITE TRACKING INFORMATION IN A COMPACT FORMAT

(75) Inventors: Frank van Diggelen, San Jose, CA (US); Charles Abraham, San Jose, CA (US); James W. LaMance, San Jose, CA (US)

(73) Assignee: Global Locate Inc., San Jose, CA (US)

Reexamination Request:
No. 95/001,373, Jun. 8, 2010

Reexamination Certificate for:
Patent No.: 6,651,000
Issued: Nov. 18, 2003
Appl. No.: 09/915,219
Filed: Jul. 25, 2001

( * ) Notice: This patent is subject to a terminal disclaimer.

(51) Int. Cl.
*G01S 1/00* (2006.01)
*G01C 21/26* (2006.01)

(52) U.S. Cl. .................. 701/213; 342/352; 342/357.43; 342/357.64

(58) Field of Classification Search .................. 701/213
See application file for complete search history.

(56) References Cited

To view the complete listing of prior art documents cited during the proceeding for Reexamination Control Number 95/001,373, please refer to the USPTO's public Patent Application Information Retrieval (PAIR) system under the Display References tab.

*Primary Examiner* — Peter C. English (57) ABSTRACT

A method and apparatus for creating and distributing satellite tracking data in a compact format to a remote receiver. At least a portion of the satellite tracking data is extracted from memory and is formatted into a compact format. The compact formatted data is transmitted to the remote receiver via a distribution network. Once this data is received at the remote receiver it is reformatted into a format prescribed by the remote receiver.

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

Claims 1, 2 and 5 are cancelled.
Claims 3, 4 and 6-33 were not reexamined.

\* \* \* \* \*